United States Patent [19]
Carter et al.

[11] Patent Number: 6,085,187
[45] Date of Patent: Jul. 4, 2000

[54] METHOD AND APPARATUS FOR NAVIGATING MULTIPLE INHERITANCE CONCEPT HIERARCHIES

[75] Inventors: Gary Lee Carter, Woodbridge, Conn.; Steffen Michael Fohn, Raleigh, N.C.; Arthur Reginald Greef, Seattle, Wash.; Gregory Christopher Hansen, Fort Lee, N.J.

[73] Assignee: International Business Machines Corporation, Armonk, N.Y.

[21] Appl. No.: 08/977,092

[22] Filed: Nov. 24, 1997

[51] Int. Cl.[7] ........................................ G06F 17/30
[52] U.S. Cl. .................... 707/3; 707/4; 707/10; 345/302; 345/335
[58] Field of Search ........................... 707/3, 4, 10, 103, 707/515; 395/701; 345/302, 335

[56] References Cited

U.S. PATENT DOCUMENTS

| | | | |
|---|---|---|---|
| 5,680,619 | 10/1997 | Gudmundson et al. | 395/701 |
| 5,832,499 | 11/1998 | Gustman | 707/103 |
| 5,870,739 | 2/1999 | Davis, III et al. | 707/4 |
| 5,873,079 | 2/1999 | Davis, III et al. | 707/3 |

*Primary Examiner*—Wayne Amsbury
*Assistant Examiner*—Thu-Thao Havan
*Attorney, Agent, or Firm*—Steven Meyers

[57] ABSTRACT

A method and apparatus for navigating a concept hierarchy that interrelates a hierarchical presentation of the concepts of the hierarchy with a presentation of the declarations and constraints of those concepts is provided. The method includes the use of an additional computer screen presentation in which the presentation of the concepts and their declarations and restraints are interrelated. The user uses the screen to generate either a dictionary of the terms of all the concepts in the hierarchy, or a dictionary of descriptive terms of all the properties associated with those concepts. Means are provided on the screen for a user to then interrogate the generated dictionary for a desired property or concept. In a search of a dictionary of concept terms, once a desired property concept or property has been located and selected, the screen server provides, for use in continuing the search, a list of the properties that define the selected concept. If the search is of a dictionary of property terms, selection of a property produces a list of related concept terms. Irrespective of whether the list is of concept or property terms, the user can then select a term from the created list as an entry point into a tree view of the hierarchy or property presentation of a concept.

21 Claims, 12 Drawing Sheets

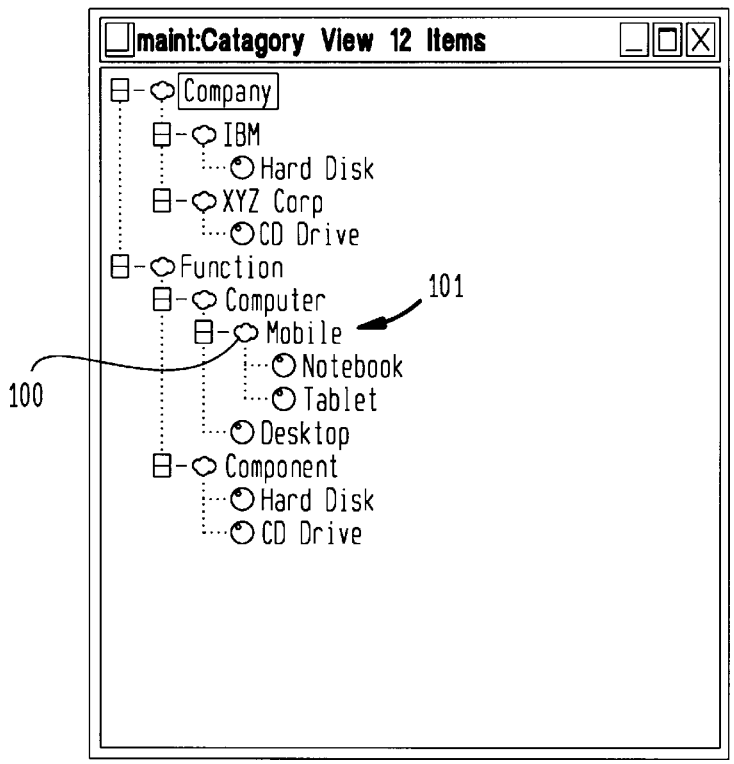

METHOD AND APPARATUS FOR NAVIGATING MULTIPLE INHERITANCE CONCEPT HIERARCHIES

RELATED PATENT APPLICATIONS

1. U.S. patent application Ser. No. 08/472,414 filed on Jun. 7, 1995 and entitled "Method and Apparatus for Representing Knowledge About Entities" (Applicants Docket No. CT9-95-002). The contents of the above identified application are hereby incorporated herein by reference.

2. U.S. patent application Ser. No. 08/976,652 filed on even data herewith and entitled "Method and Apparatus for Maintaining Multiple Inheritance concept Hierarchies" (Applicants Docket No. SE9-97-028). The contents of the above identified application are hereby incorporated herein by reference.

3. U.S. patent application Ser. No. 08/688,350 filed Jul. 30, 1996 and entitled "Enhanced Tree Control System for Navigating Lattices Data Structures & Displaying Configurable Lattice-Node Labels" (Applicants Docket No. SE9-96-001). The contents of the above identified application are hereby incorporated herein by reference.

4. U.S. patent application Ser. No. 08/725,961 filed Oct. 7, 1997 and entitled "Enhancing Feature Based Search Through Feature Reliance Reasoning" (Applicants Docket No. SE9-96-003). The contents of the above identified application are hereby incorporated herein by reference.

TECHNICAL FIELD

The present invention relates to a method and apparatus for accessing databases. More particularly, it relates to computer screens for representing the contents of a database and a search engine using those screens for accessing the database.

BACKGROUND

A hierarchy is a common method for organizing information. The table of contents for a book, an index system for a library and a function chart for a company's departments are examples of hierarchical arrangements of information. A hierarchy comprises nodes and their interrelationships. When a hierarchy interrelates structured nodes, those nodes are commonly called concepts (other terms used for nodes include scenes, frames, individuals and classes). The structure of a concept is described by the use of characterizing attributes called properties.

The meaning given to these concepts and their hierarchical interrelationships depends on the real world domain that is being represented by the data hierarchy or structure. Structures comprising concepts and their interrelationships are commonly known as "part-of" decomposition hierarchies and "is-a" abstraction hierarchies.

A "part-of" decomposition hierarchy is typically found in corporation departmental organization charts. Each sub-department is part-of a super-department. For example, the Electronic Catalog Division and Electronic Transaction Division are part-of the Electronic Commerce Division. The Electronic Commerce Division and Information Distribution Division are part-of the Internet Division which is in turn part-of the Software Division.

An "is-a" abstraction hierarchy is typically found in biological animal and organism classification charts. Each sub-abstraction is-a more specific (specialized) description of a super-abstraction. For example, the family of lions and the family of tigers are more specific descriptions of the family of large cats. The family of large cats and the family of humans are more specific descriptions of the family of mammals. The sub-concepts in these hierarchies usually share common properties with their super-concepts. We take advantage of this fact and minimize the amount of data we need to store by only defining common properties in a super-concept and allow sub-concepts of the super concept to "inherit" (access, use) these properties as part of their own definitions. Hierarchies with this characteristic are termed inheritance hierarchies. When a sub-concept can interrelate to only on super-concept, the hierarchy is termed a single inheritance concept hierarchy, and when a sub-concept can interrelate to more than one super-concept, the hierarchy is termed a multiple inheritance concept hierarchy. An example of a multiple inheritance concept hierarchy is found in the above mentioned U.S. application Ser. No. 08/472,414 (Applicants' Docket number CT9-95-002).

A way of visualizing these hierarchical data structures is by using a tree view as shown in FIG. 1. One method for visualizing any structured node in the tree view of FIG. 1, in combination with that nodes properties, would be to use a concept view as shown in FIG. 2. The example given in FIG. 2 is for the "Mobile" structured concept 100 of FIG. 1.

With these two views, a user can navigate the concept hierarchy shown in FIG. 1 by starting at the root concepts "Company" or "Function" and continue thru the sub-concepts until the leaf concepts are reached. At each concept, a concept view, such as the one of FIG. 2, can be consulted for a detailed examination of the structure of the concept. Switching back and forth between hierarchial and concept type views is a popular method of investigating concept hierarchies.

The problem with this method is that it uses two loosely linked views of the interrelationship between elements of the hierarchy, i.e., the hierarchical relationship between concepts shown in FIG. 1, and the membership relationship between a single concept and its properties shown in FIG. 2. Use of the approach requires a user to always retain a mental model of the hierarchial relationship between the concepts. To ready this difficulty, some applications have provided a search facility that will locate a cursor 101 at the concept in a tree hierarchy, such as the one of FIG. 1, where its string identifier matches the search entry. This technique leverages the relationship between the string identifiers in the application and the concepts in the hierarchy. However even with the use of the cursor, this approach to investigating concept hierarchies does not visualize the inheritance relationships between property declarations and constraints. At best, it constitutes a search method, not a navigation method, since it is an action that either passes or fails as opposed to a incremental method of browsing concept hierarchies.

BRIEF DESCRIPTION OF THE INVENTION

The present invention provides a method and apparatus for navigating a concept hierarchy that interrelates a hierarchical presentation of the concepts of the hierarchy with a presentation of the declarations and constraints of those concepts. The invention includes the use of an additional computer screen presentation in which the presentation of the concepts and their declarations and constraints are interrelated. The user uses the screen to generate either a dictionary of the terms of all the concepts in the hierarchy, or a dictionary of descriptive terms of all the properties associated with those concepts. Means are provided on the screen for a user to then interrogate the generated dictionary for a desired property or concept. In a search of a dictionary of a concept term, once a desired concept or property has been located and selected, the screen server provides, for use in continuing the search, a list of the properties that define the selected concept. If the search is of a dictionary of property terms, selection of a property produces a list of related concept terms. Irrespective of whether the list is of concept or property terms, the user can then select a term from the created list as an entry point into a tree view of the hierarchy or property presentation of a concept.

Therefore, it is an object of the present invention to provide a computer generated method for interactively navigating multiple inheritance concept hierarchies.

It is another object of the present invention to remove the necessity for the user to maintain a mental map of the concept hierarchy when exploring the space of string identifiers that comprise the "name space" of multiple inheritance concept hierarchies.

BRIEF DESCRIPTION OF THE DRAWINGS

These and other objects, features and advantages of the invention can best be understood by reference to the following detailed description while making reference to the accompanying drawings of which:

FIG. 1 is a computer screen presentation showing a hierarchial view of the concepts in a database;

FIG. 2 is a computer screen presentation showing the properties of one of the concepts in FIG. 1;

DETAILED DESCRIPTION OF THE INVENTION

Figure 3:
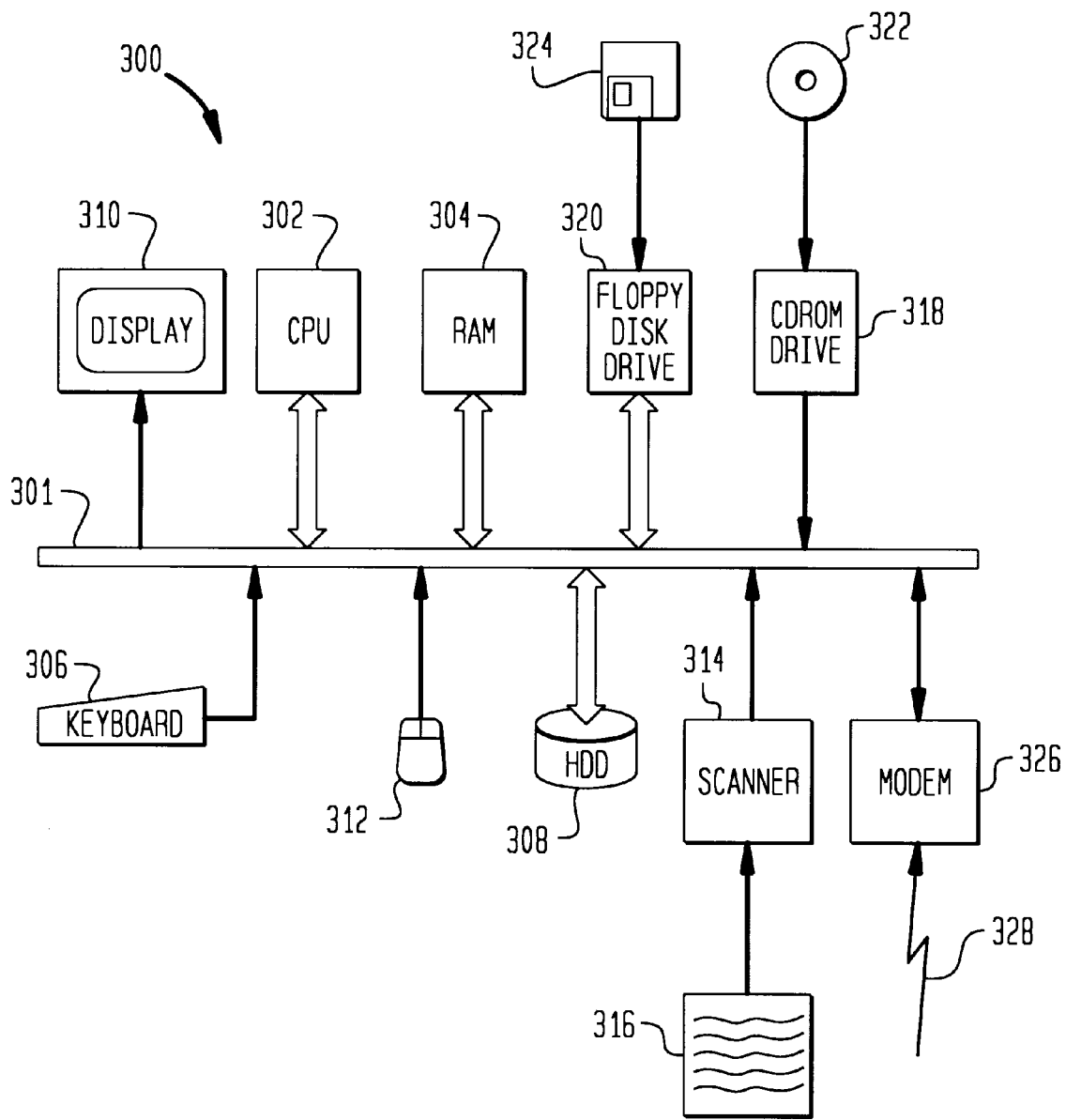
FIG. 3 is a block diagram of a computer system containing the present invention.

The present invention is capable of running on any properly configured general purpose computer system, such as the one shown in FIG. 3. Such a computer system 300 includes a processing unit (CPU) 302 connected by a bus 301 to a random access memory 304, a high density storage device 308, a keyboard 306, a display 310 and a mouse 312, such as Mouse Port Compatible Mouse 2.0A of the Microsoft Corporation. Also attached to the CPU 302 by the bus 301, are a scanner 314 for scanning documents 316 into the computer 300; and CD-ROM and magnetic disc drivers 318 and 320 for entry of information from optical and floppy magnetic discs 322 and 324 containing program code and data. An example of such a computer is an IBM Personal Computer of the International Business Machines Corporation, such as an Aptiva L31 Model with a 233 MHz Pentium processor of Intel Corporation operating under Microsoft Windows NT operating system of the Microsoft Corporation.

Figure 4:
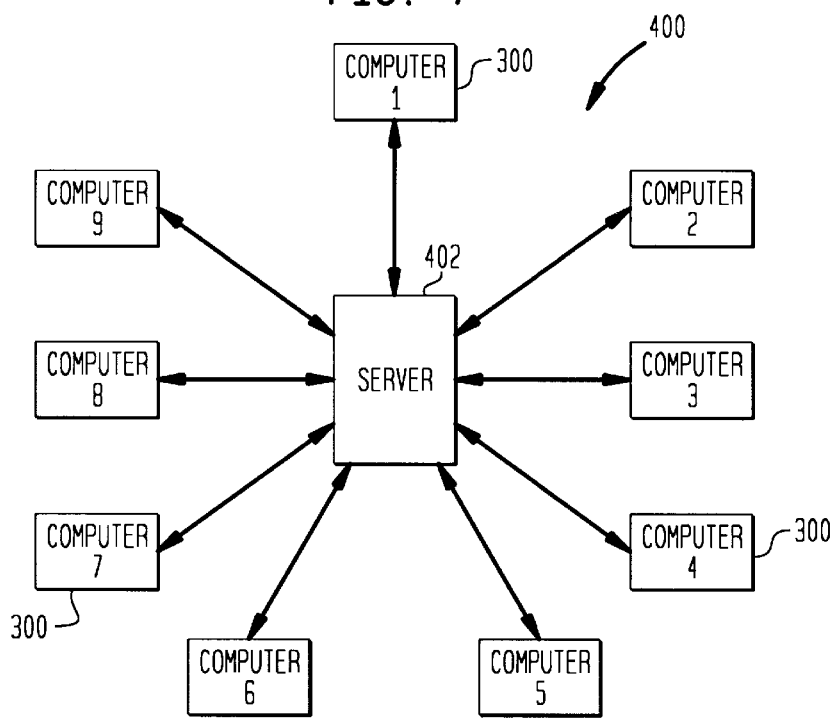
FIG. 4 is a block diagram of a network of computers such as the one shown in FIG. 3.

The computer 300 also contains a modem 326 for telecommunication of information 328 on the Internet and other networks. As shown in FIG. 4, computers 300, like the one described above, that are connected together in network 400 by a server 402 can be used to exchange information and one computer can access information contained in another. In other words, the screens and search engines described in this application can be used on say computer 1 to access a database on computer 2. The screens and the search engine may be permanently located on computer 1, or one or both can be transmitted to computer 1 by computer 2 when the computer 2 database is to be accessed.

Figure 5:
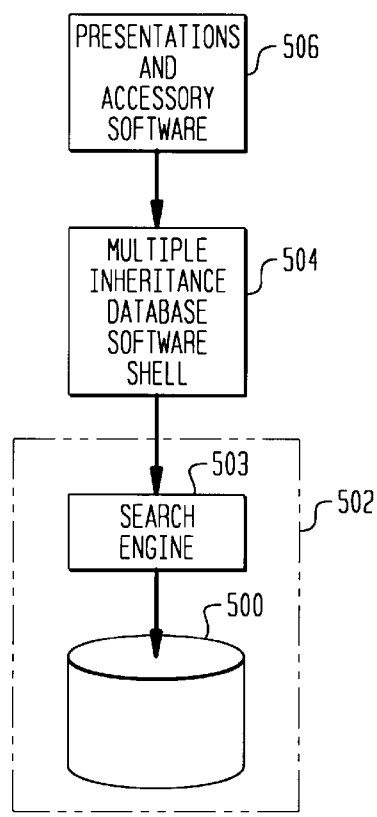
FIG. 5 is a block diagram of a database system to which the present invention applies.

As shown in FIG. 5, the data 500 is stored in a database 502, such as the DB2 Relational Database of International Business Machines Corporation. It is accessed through the database search engine 503 and a multiple-inheritance concept hierarchy shell 504 configured in the manner described in copending U.S. patent application Ser. No. 08/472,414 filed on Jun. 7, 1995 and entitled "Method and Apparatus for Representing Knowledge About Entities" (Applicants Docket No. CT9-95-002). The data 500 in the database 502 can be accessed from Windows NT graphical user interface 506 on the display 310 of FIG. 3 with screens provided in accordance with the present invention.

Figure 6:
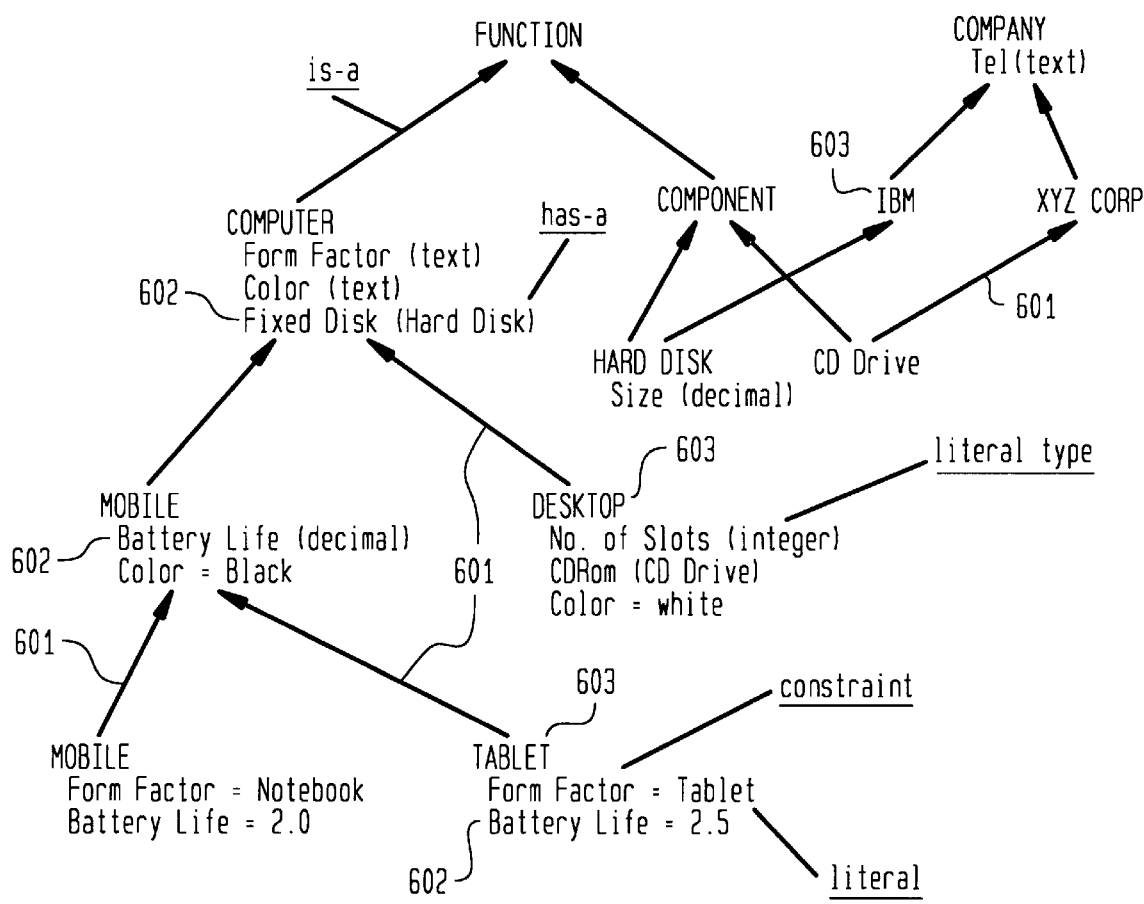
FIG. 6 is a graphical representation of a multiple inheritance concept hierarchy to which the present invention applies.

A multiple-inheritance concept hierarchy, as illustrated in FIG. 6, permits two types of interrelationships: the specialization relationship or "is-a" relationship and the composition relationship or "has-a" relationship. The is-a relationship is shown as arrows 601 in FIG. 6. For example, a Desktop "is a" computer. The has-a relationship is shown as a property 602 associated with a concept 603, e.g., a computer "has a" Fixed Disk (Hard Disk) in FIG. 6. The specialization relationship is an inheritance relationship between super-concepts and sub-concepts. The properties of a concept comprise its composition relationships. These relationships are not inheritance relationships between the concepts. They capture the fact that the host concept is composed of one or more other concepts or literal types. A literal type describes a set of atomic concepts whose elements have no structure. The set of real numbers, the set of integer numbers and the set of strings are termed literal types. The elements of these sets are termed literals.

Literal typed properties can be constrained by the literals as shown in FIG. 6. A literal type property declaration is:

Form Factor (text)

and the constraint is:

Form Factor="Notebook"

FIG. 6 shows how a property declared in one super-concept can be inherited by a sub-concept and thus the sub-concept is constrained by the super-concept. For instance, the sub-concept "Desktop" is constrained by the property of the super-concept "Computer" and therefore must have a Hard Disk.

In FIG. 6, the concepts "Function" and "Company" are termed "root" concepts (they have no super-concepts) and concepts "Notebook", "Tablet", "Desktop", "Hard Disk" and "CD Drive" are termed "leaf" concepts (they have no sub-concepts). The concept "Hard Disk" inherits properties from both the concepts "Component" and "IEM". Properties that have been inherited by a sub-concept from a super-concept are termed "inherited properties" of the sub-concept. Those that are declared within a concept are termed "local properties" of the concept.

Figure 7:
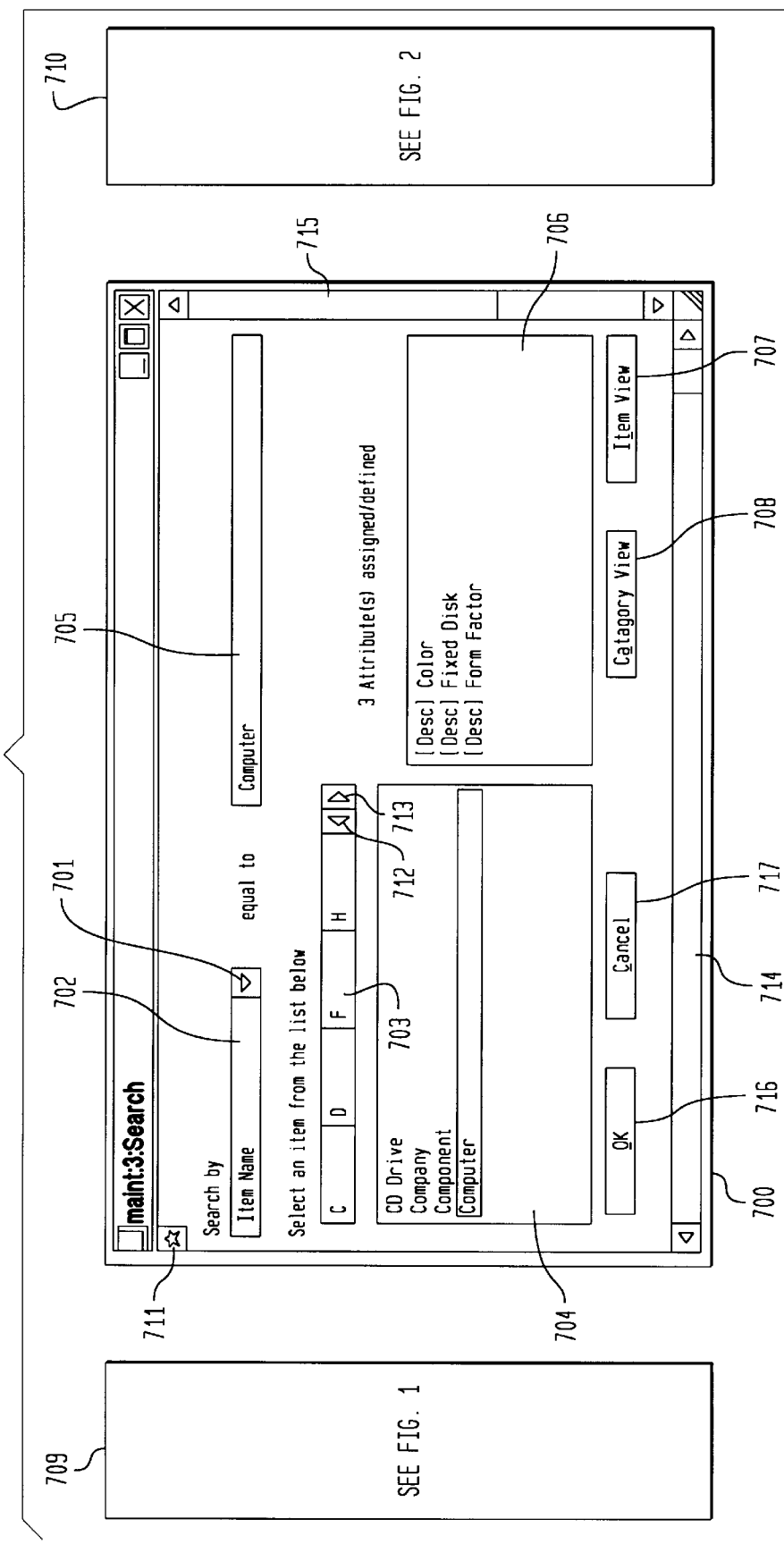
FIGS. 7 and 8 are graphic representations of computer screens in accordance with the present invention.

In accordance with the present invention, navigating multiple inheritance concept hierarchies involves the use of a computer screen, like the one shown in FIG. 7. This screen visualizes the hierarchy's name space. This "name space" view is used in concert with both the tree view visualization of the hierarchy shown in FIG. 1, and visualization views of concepts and their properties, such as the one shown for "mobile" in FIG. 2.

Figure 10:
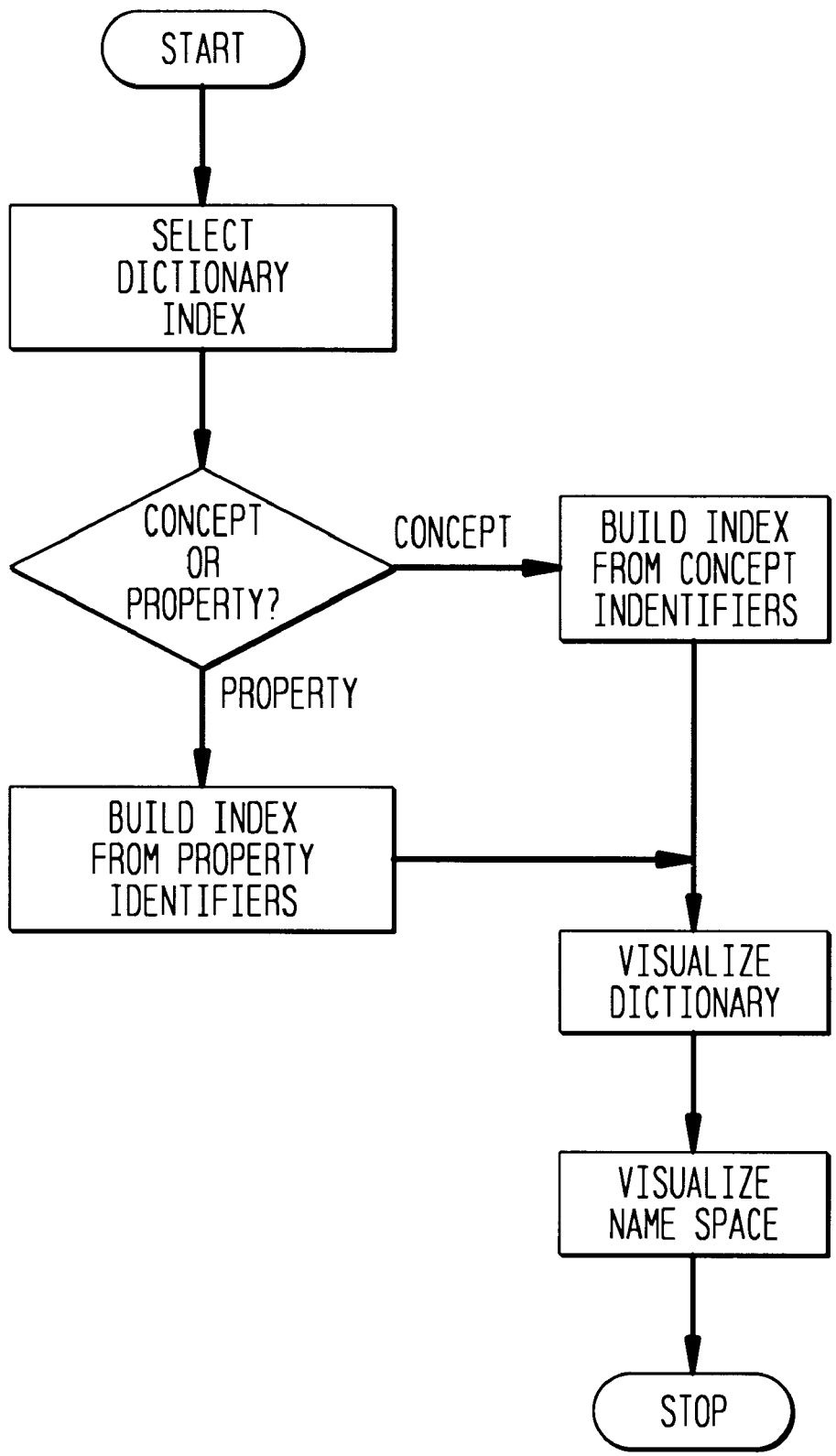
FIGS. 10 to 14 are flow diagrams illustrating the functioning of the computer screens of FIGS. 7 and 8.

The name space view screen 700 shown in FIG. 7 includes a drop down list for making selections from concept or property terms. The selection is made by depressing the mouse button with the cursor on button 701. Either an Item Name (concept) or a Describing Name (property) will then appear in search type space 702. The search engine servicing the name space screen generates a dictionary of all the terms used to describe concepts when Item Name is placed in the search type space 702, and a dictionary of all the terms used to describe properties when Describing Name is placed in the search space 702. (See FIG. 10 for a flow chart of the system response to the selection Item Name (concept) or Describing Name (property)).

With the desired dictionary generated, the concept or property term to be searched upon can be entered. Entry of the term can be accomplished in one of two ways. One way is to invoke a dictionary search by selecting one of the lettered buttons 703 which appear when the dictionary is created. Selection of a lettered button, places all concepts or their properties beginning with the selected letter into the dictionary display space 704. For instance, if the search is by Item Name and the letter "C" is selected, all four concept terms in the tree view of FIG. 1 that begin with the letter "C" appear in the dictionary display space 704, and a selection of the search terms can be completed by a mouse or other selection mechanism.

The alternative way of interrogating the dictionary is to type the desired search term into search term selection space 705. For instance, when a concept term search is selected and the word "computer" is to be the term searched, the typing of the letter C into the space 705 brings up the same four selections in the dictionary search space as selecting the letter C from the string of letters 703. However, as the typing continues, the selection in the dictionary display space 704 diminishes. First with the typing of the letter "O", CD Drive vanishes from the list in dictionary space 704, and when "U" is typed, "company" and "component" disappear leaving "computer" as the only selection in space 704. When the narrowing of the search field to the concept "computer", the property or attributes of the concept "computer" shown in FIG. 6 appear in the identification space 706. If the search had been on properties rather than concepts, a list of concept terms, associated with the selection property term, would appear in the identification space 706. With all four choices viewed, the narrowing of the search can also be performed selecting "computer" from the four choices with a mouse or other selection means.

As mentioned above, the name space view 700 is for use in concert with the hierarchy view of FIG. 1, and concept visualization views such as the one shown in FIG. 2. Buttons 707 and 708 enable the user to bring up either or both those views. Selection of category view button 708, brings forth the hierarchy screen 709 of FIG. 1 while activating the Item view button 707 brings the concept visualization screen shown in FIG. 2. The default situation is to have the name space view 700 disappear from the screen when either or both the screens 709 and 710 are activated. However, the selection of the pin button 711 will retain the space view on the desktop with either or both the hierarchy or concept views.

The name space view 700 has typical Windows NT operation buttons such as buttons 712 and 713 to change the letter selection 703 for the dictionary search and has scroll bars 714 and 715 to scroll through selections on the dictionary and identification space 704 and 706, respectively. Windows NT "OK" and "Cancel" buttons 716 and 717 also appear on view 700.

Note that the names in the displays of FIGS. 1, 2, 7 and 8 are specific to the domain of electronic catalogs. Electronic catalogues use the term "item" for "concept", "attribute" for "property", "category view" for "hierarchy view" and "item view" for "concept view". As pointed out above, the screens of FIGS. 1, 2, 7 and 8 are Windows NT screens and are compatible with, and selectable by, Windows NT operations. Windows NT compatible screens such as these can be designed using Microsoft Visual C++ of Microsoft Corporation.

Locating a Concept using a Concept Identifier

If a user of the name space view 700 wishes to locate a concept in the hierarchical view of FIG. 1 using only the concept's identifier, it is achieved by first selecting Item Name in the selection box, 702, of FIG. 7. The search engine then constructs a notebook dictionary of the terms used as concept identifiers in the hierarchy, and generates the dictionary list 703 of the beginning letters for all the concept terms.

Figure 11:
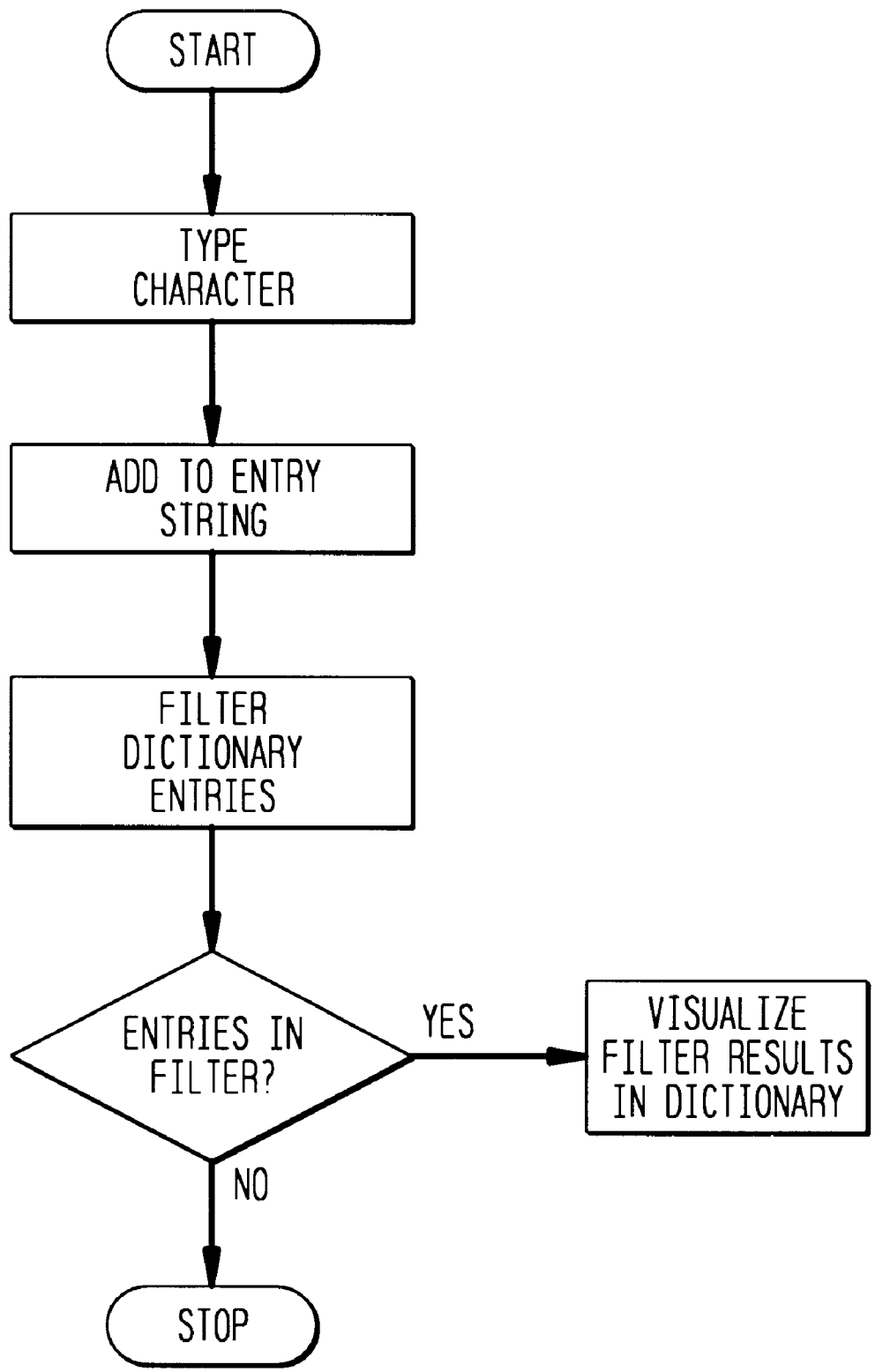

The user can now select the letter from the list 703 that corresponds to the first letter of the identifier that they wish to locate. There are no identifiers in the hierarchy view of FIG. 1 that start with the character "E" and thus no letter E in the list 703. The user can also enter a search by typing a search word. As pointed out above, as the user types the letters, the application starts out displaying in space 704 all words from the dictionary starting with the first letter, and as more letters are typed the entries in the list will be filtered out to just those that match the typed in letters. This is known as look-ahead character entry. (See FIG. 11 showing the operation of the system in response to typing an entry.)

Figure 12:
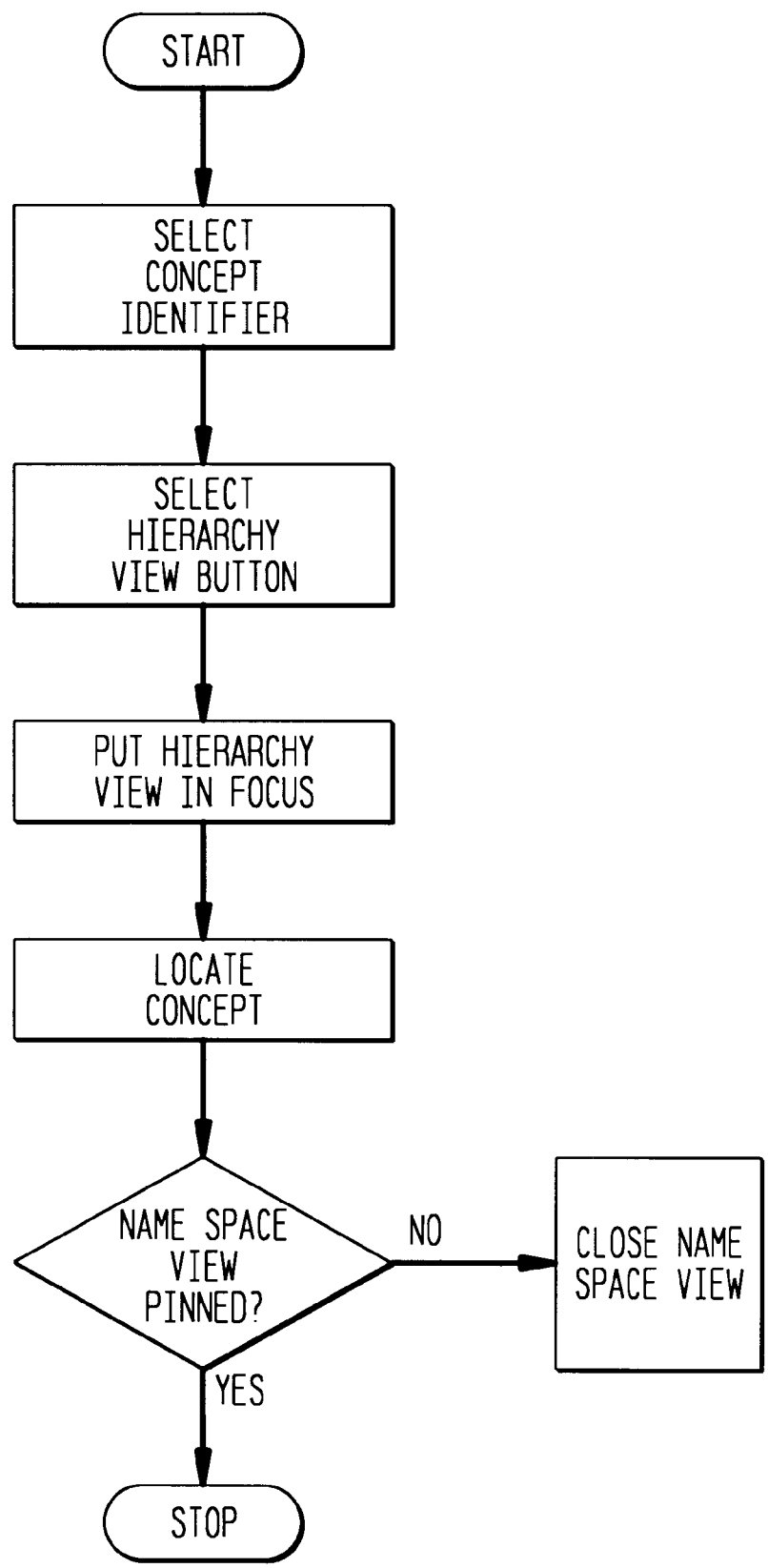

When the user is able to see the identifier for the concept that he or she wishes to locate, the user can select the entry on the list 704 with the computer mouse. To locate the corresponding concept in the hierarchy view, the user either double-clicks on the desired entry in the list or selects the hierarchy view (category view) button, 708. (See FIG. 12 for this process.) The application will then switch to the hierarchy view and highlight the sought after concept. As pointed out previously, the space view 700 will disappear from the Desktop if it has not been pinned by activating pin button 711.

Locating Property Using Property Identifier

Figure 13:
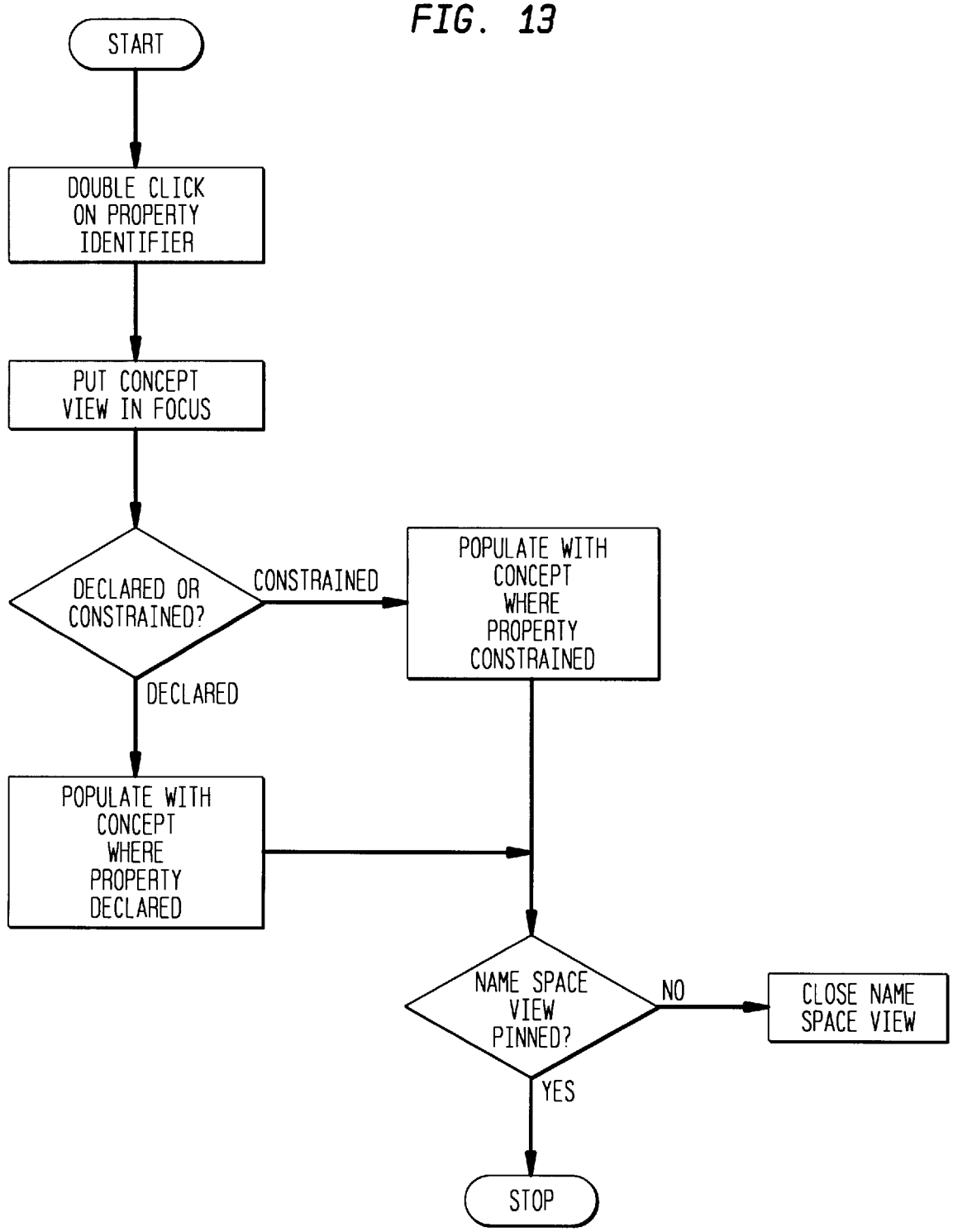
Figure 14:
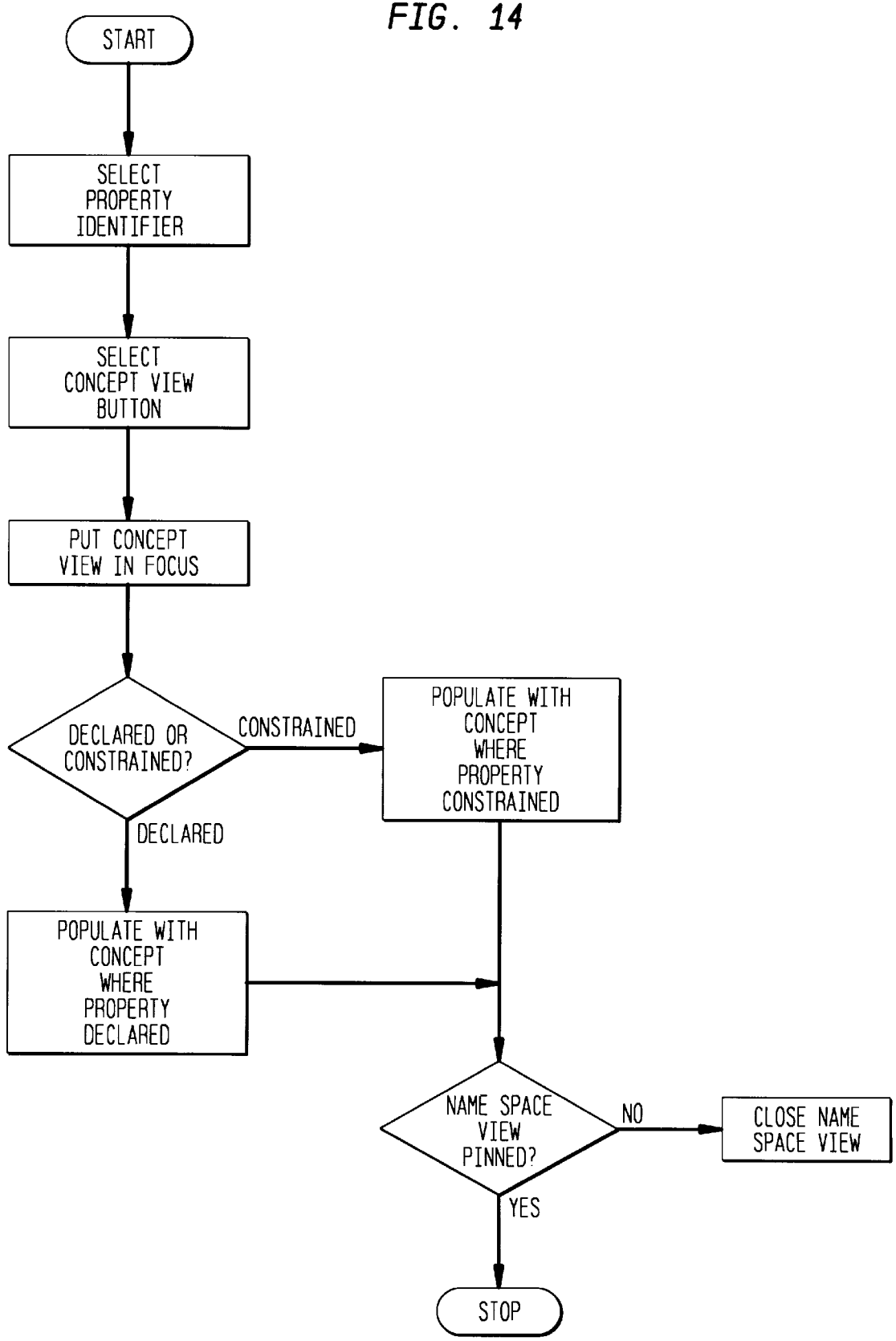

A similar scenario is followed when the user is locating a property. In this scenario, a user selects Describing Name in the selection box, 702, of FIG. 7. The application will then generate a notebook dictionary comprising all of the property names in the hierarchy. The user can then double click on the property name or select the Item View button 707 and a concept view, like the one of FIG. 2, will be brought into focus. The concept name in the item view will correspond to the concept in which the property is declared. (See FIGS. 13 and 14 illustrating these processes.)

Locating a Property using a Concept Identifier

Consider another scenario for locating a property that is declared in a concept. The user selects Item Name in the selection box, 702, of FIG. 7. The user then selects C and clicks on the "Computer" concept in the list box, 704, of FIG. 7. If the concept has property declarations, they are displayed in the list box, 706, as shown in FIG. 7. The user may now select a property identifier and selects the Item View button 707 to bring the concept view into focus as before, or they may double click on the property identified to achieve the same result.

Locating a Concept using a Declared Property Identifier

Another scenario is to locate a concept in which a property is declared. This is achieved by selecting Describing Name in the selection box, 702, of FIG. 7. The notebook dictionary will now contain terms used as the property identifiers.

Figure 8:
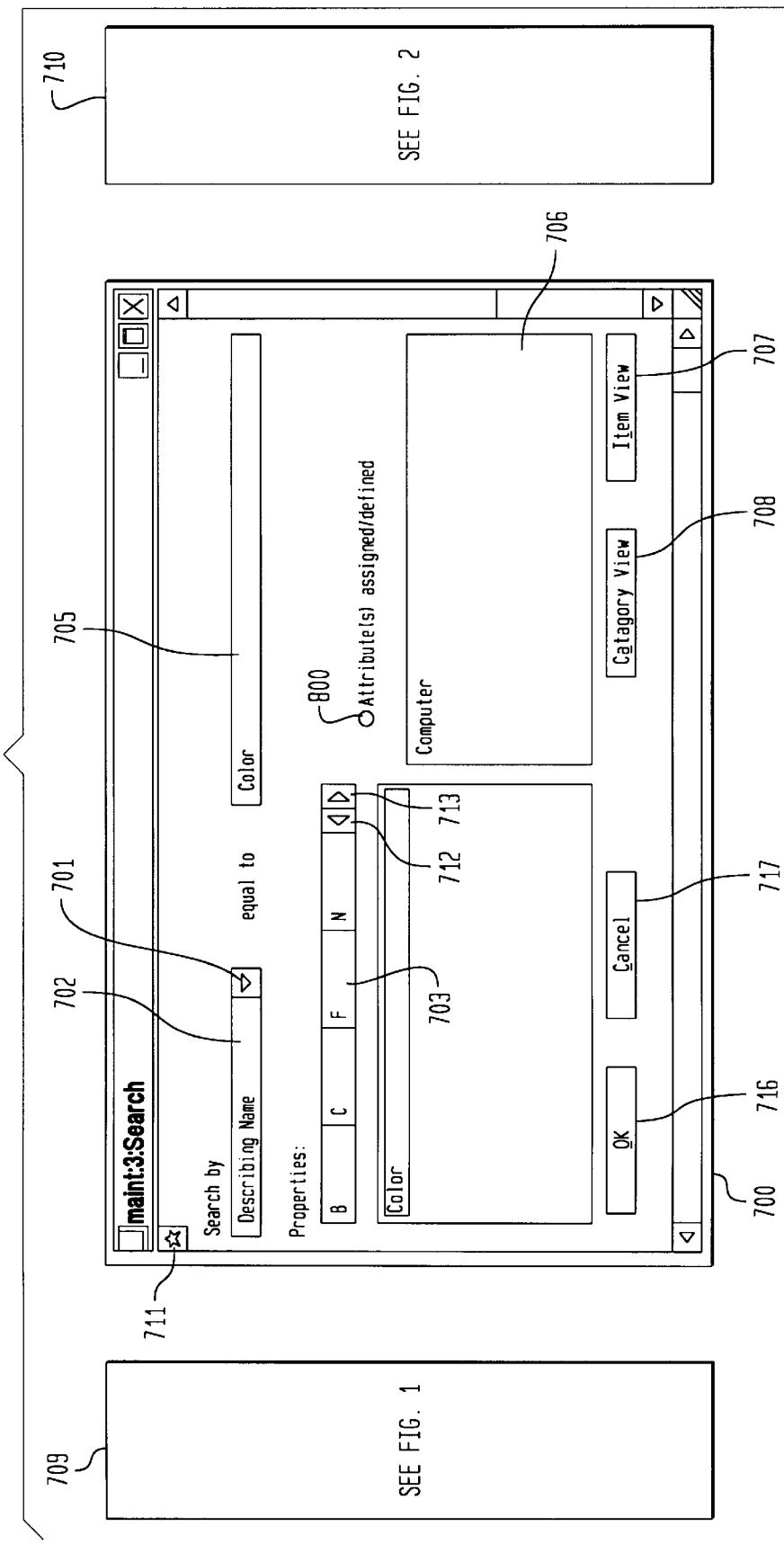

If the user selects the property name "Color" and the radio button, 800, in FIG. 8 is not selected, then the list box, 706, will be filled with those concepts in which a Color property is declared (there may be more than one declaration). FIG. 3 shows that the Color property is declared in the computer concept, and therefore computer is listed in the list box 706. The user may now bring either the hierarchy view or the concept view into focus in the same manner as before.

Locating a Concept using a Constrained Property Identifier

If the Color property is selected when the radio button, 801, in FIG. 8 is selected, then the concepts within which the Color property is constrained, instead of those where it is declared, are displayed in the list box, 706. The elements of the list box are then "Mobile" and "Desktop" as the Color property is constrained in both of these concepts, as shown in FIG. 6. The user may now bring either the hierarchy view or the concept view into focus in the same manner as before in connection with one of those terms.

The default operation for the name space view is for it to disappear whenever the hierarchy or concept view is brought into focus. This behavior can be modified by selecting the toggle button, 711, in FIG. 7. (Also see flow diagrams of FIGS. 12 and 15.) This is the "pin" button that will prevent this view from disappearing. In this way, a user can navigate the concept hierarchy by simply traversing identifier relationships as displayed in the name space view.

Figure 9:
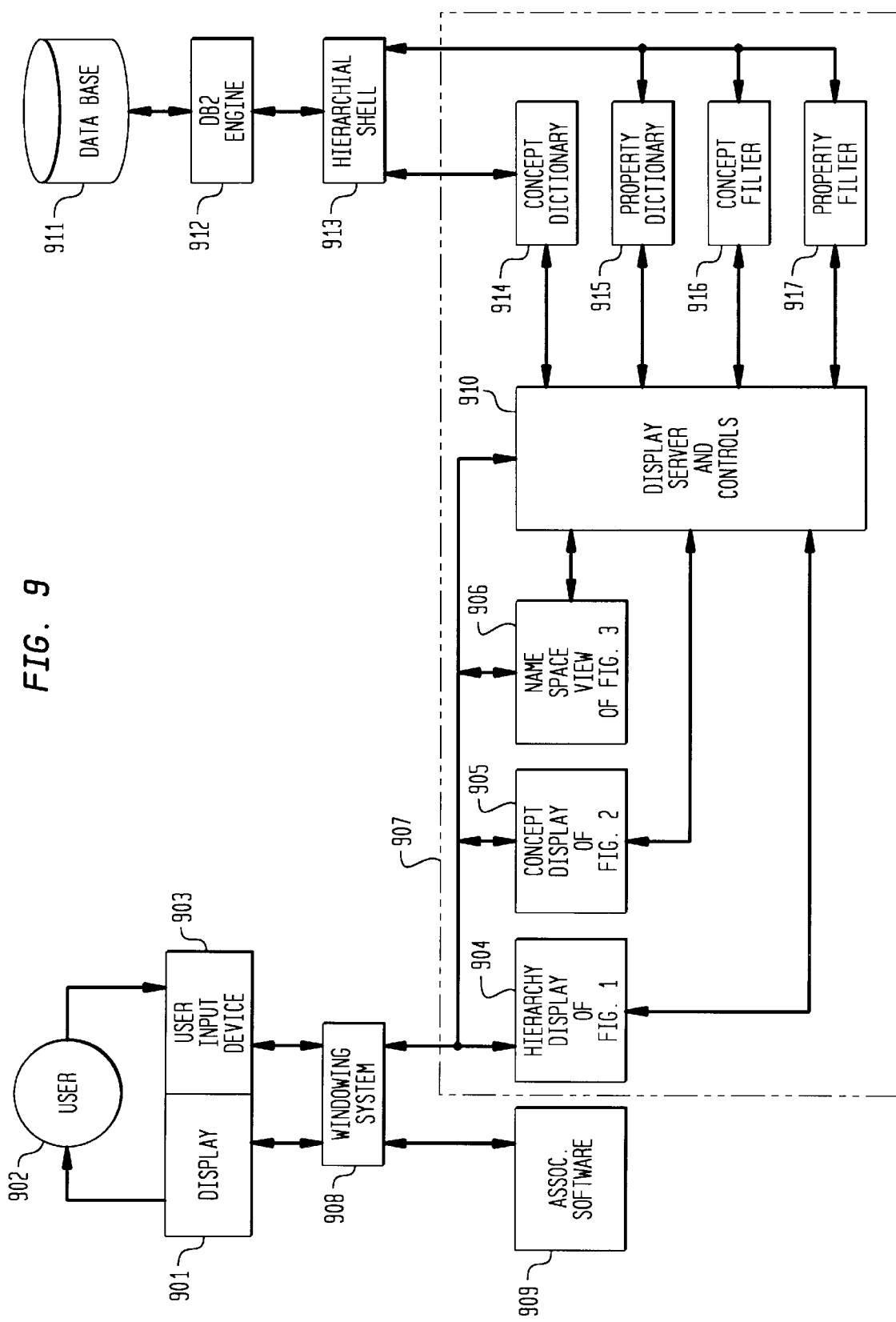
FIG. 9 is a block diagram of a search engine in accordance with the present invention.

Referring now to FIG. 9, the system 900 includes a display 901, such as one described in connection with FIG. 3 which interacts with the user 902 through commands entered through user input device 903 (such as a mouse and keyboard) to present the screens 904, 905 and 906 shown in FIGS. 1, 2 and 7, respectively. The displays are provided by a search engine 907 in response to control signals inputted by the user 902 through the user interface device 903. A windowing system 908, such as the Windows NT operating system, acts as an intermediary between the search engine 907 and the user input device 903 and display 901. The search engine 907 includes the displays 904 to 906, a display server 910 for populating the displays with data from the concept dictionary 914 or property dictionary 915 which is filtered by the property filter 917, or the concept filter 918 respectively, and provided to the pertinent property or concept. The display server 910 receives data from the database 911 serviced by the database engine 912 through a hierarchial shell 913, such as one provided in accordance with the above mentioned U.S. patent application Ser. No. 08/472,414 (Applicants' docket number CT9-95-002). The display server 910 interfaces the hierarchial shell 913 through a notebook dictionary 914 generated when the search is started with the user making a selection in the drop-down list 702 of FIG. 7. In addition to the notebook dictionary 914, the server receives material to populate the identification space 706 through module 915 upon selection of search word from the dictionary, and through modules 916 and 917 in response to inputs provided by the user through the user input device 903.

The logic blocks of FIG. 9 represent functions performed by the software of the present invention. Though a software embodiment is provided in the present embodiment certain of the functions could be embodied in hardware.

Above we have described an embodiment of the invention and modifications of the invention obvious to those skilled in the art, and therefore it is understood that the invention also covers embodiments within the spirit and scope of the appended claims.

We claim:

1. A method of operation in a search engine for a multiple inheritance concept hierarchy comprising the steps of:

providing computer screen displays of two search classes including at least one screen display of a class covering concept terms arranged in tree view of the multiple inheritance concept hierarchy and at least one other screen display of a class covering terms for properties attributable to one or more of the concepts of the hierarchy for the selection, by a user, of one of the screen display of the classes;

establishing a third computer screen display containing a dictionary of the terms used in the hierarchy that fall within a selected one of the two classes and creating a visualization of terms from the selected class for the choosing of search terms from the dictionary; and associating in the third computer screen the terms of the selected class each with terms from a nonselected class so that the search term can be used for selecting of one of the associated terms as a further search term by the user.

2. The method of operation of claim 1 including:

using the further search terms to generate a view in either said at least one screen display or said at least one other screen display of a portion of terms in the hierarchy related to the further search term.

3. The method of operation of claim 2 wherein:

said search term is a concept term, said further search terms is a term for a property and said portion of terms in the hierarchy is in the tree view of the concepts of the hierarchy associated with the search term.

4. The method of operation of claim 2 wherein:

said search term is a property term, said further search term is a concept term and said portion of terms in the hierarchy is in said at least one other screen display containing a view of property terms related to said further search term.

5. A computer program on a computer usable medium containing a search engine for a hierarchial database comprising:

view computer code for providing computer screen displays of two search classes, one of the displays of a class covering concept terms and the other of the displays a class covering terms for properties attributable to one of more of the concepts of the hierarchy for the selection, by a user, of one of the classes;

dictionary computer code for establishing a third computer screen display for displaying a dictionary of the terms in the hierarchy that fall within a selected one of the two classes and creating a visualization of terms of the selected class for the choosing of search terms from the dictionary; and further dictionary computer code for associating in the third display the terms of the selected class with terms from a nonselected class which terms are related to the search terms for selecting of one of the associated terms as a further search term by the user.

6. The computer program of claim 5 including computer code responsive to said search term or said further search term to generate a view in either the at least one display or the at least other display of terms in the hierarchy related to the further search term.

7. The computer program of claim 6 including:

computer code for providing a tree view of the concepts in the hierarchy related to the further search term in response to interrogation of the further search term.

8. The computer program of claim 6 including:

computer code for providing a view of those property terms in the other of the displays that are related to said further search term.

9. The user interface of claim 5 including selection means for selecting for viewing where a concept either contains the property declaration or the property constraint.

10. A user interface for a search engine of a hierarchial database, said interface comprising:

a dictionary display including a search type space for selecting between two search classes, one search class including concept terms used in the hierarchy and another search class containing terms for properties attributable to one or more of the concepts, a dictionary search space for displaying terms from a selected one of the two classes for selecting a search term from the displayed terms; and a list space for displaying terms from a nonselected one of the two search classes for use in relating terms in the one search class to those in the another search class.

11. The user interface of claim 10 including:

a bar containing first letters of terms in the selected one of the search classes for selection of a letter to fill the dictionary search space with terms beginning with said letter.

12. The user interface of claim 10 including:

at least one additional display of the terms in one of the search classes.

13. The user interface of claim 12 including:

selection means for providing a view from the at least one additional display of the hierarchy contents which contents are related to the search term or a selected further search term from the list space.

14. The user interface of claim 13 wherein said selection means is an indicia in the display for activating said one additional view.

15. The user interface of claim 13 wherein said selection means is means responsive to selection of a further search term.

16. The user interface of claim 15 wherein said selection means is means responsive to a double click of a mouse in making the selection of the further search term.

17. The user interface of claim 13 including:

pin means for maintaining said dictionary display upon activation of said selection means and default means for eliminating said display from the user interface in absence of activation of the pin means.

18. The user interface of claim 17 wherein there are a plurality of additional displays one a tree view of concept terms and the others each containing views of properties attributable to one of the concepts.

19. The user interface of claim 17 in combination with a computer including:

a display device for displaying the user interface and software for generating the dictionary display and the additional displays.

20. The user interface of claim 19 including a network including a server providing the contents of the hierarchial database.

21. The user interface of claim 13 including:

term space for typing in a term of the selected class.

* * * * *